United States Patent
Ohnishi et al.

(10) Patent No.: US 7,450,840 B2
(45) Date of Patent: Nov. 11, 2008

(54) IMAGE DISTRIBUTION APPARATUS, IMAGE RECEIVING APPARATUS, MANAGEMENT METHOD FOR IMAGE DISTRIBUTION APPARATUS, AND SETTING METHOD FOR IMAGE RECEIVING APPARATUS

(75) Inventors: Motoo Ohnishi, Kawasaki (JP); Takashi Oya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 289 days.

(21) Appl. No.: 11/251,157

(22) Filed: Oct. 13, 2005

(65) Prior Publication Data

US 2006/0078329 A1    Apr. 13, 2006

(30) Foreign Application Priority Data

Oct. 13, 2004  (JP)  ............... 2004-298401

(51) Int. Cl.
*G03B 17/48* (2006.01)
*H04N 5/232* (2006.01)

(52) U.S. Cl. ............... 396/429; 348/211.3; 348/211.7; 348/211.8; 348/211.13

(58) Field of Classification Search ............... 396/429; 348/14.05, 14.08, 14.09, 143, 156, 211.99, 348/211.1, 211.2, 211.3, 211.4, 211.6, 211.8, 348/211.12, 211.13, 333.01, 333.03, 333.11, 348/333.12, 211.7; 386/1, 46, 52; 382/293, 382/295, 298, 299, 307, 311, 325
See application file for complete search history.

(56) References Cited

U.S. PATENT DOCUMENTS

| 6,529,234 | B2 * | 3/2003 | Urisaka et al. | 348/211.99 |
| 6,727,940 | B1 * | 4/2004 | Oka et al. | 348/211.3 |
| 2005/0134719 | A1 * | 6/2005 | Beck | 348/333.11 |

FOREIGN PATENT DOCUMENTS

| JP | 9-261522 | 10/1997 |
| JP | 10-136347 | 5/1998 |

* cited by examiner

*Primary Examiner*—Rochelle-Ann J Blackman
(74) *Attorney, Agent, or Firm*—Morgan & Finnegan, LLP

(57) ABSTRACT

An image receiving apparatus is assigned with a field-of-view range setting right which is a right of setting a field-of-view of an image to be distributed. A field-of-view range setting request is received from the image receiving apparatus having the field-of-view range setting right and then reflected upon a cut-out position of an image, and a field-of-view selection request is received from an image receiving apparatus not having the field-of-view range setting right, thereby selecting and an image to be distributed to the image receiving apparatus having the field-of-view range setting right as a distribution image to the image receiving apparatus not having the field-of-view range setting right.

20 Claims, 18 Drawing Sheets

FIG. 5

| CLIENT NO. | CONTROL LEVEL OF CLIENT | FIELD-OF-VIEW NO. |
|---|---|---|
| 1 | 1 | (2) |
| 2 | 1 | (1) |
| 3 | 1 | (2) |
| 4 | 1 | (3) |
| 5 | 2 | (4) |
| 6 | 1 | (3) |
| 7 | 1 | (1) |
| 8 | 1 | (1) |

FIG. 6

| CONTROL STATE | | FIELD-OF-VIEW NO. | | | |
|---|---|---|---|---|---|
| | | (1) | (2) | (3) | (4) |
| ON CONTROL | | 2 | 1 | 6 | 5 |
| CONTROL WAIT STATE | | 8 | - | 4 | - |
| | | 7 | - | - | - |

FIG. 7

| FIELD-OF-VIEW NO. | VIEWPOINT DIRECTION (PAN) | VIEWPOINT DIRECTION (TILT) | ANGLE OF VIEW (ZOOM) |
|---|---|---|---|
| (1) | -400 | -125 | 200 |
| (2) | -200 | -150 | 200 |
| (3) | 200 | 0 | 200 |
| (4) | 300 | -100 | 200 |

FIG. 17
| CONTROL STATE | CLIENT NO. | FIELD-OF-VIEW NO. |
|---|---|---|
| ON CONTROL | 5 | (4) |
| | 2 | (1) |
| | 6 | (3) |
| | 1 | (2) |
| CONTROL WAIT STATE | 4 | - |
| | 8 | - |
| | 7 | - |
FIG. 18
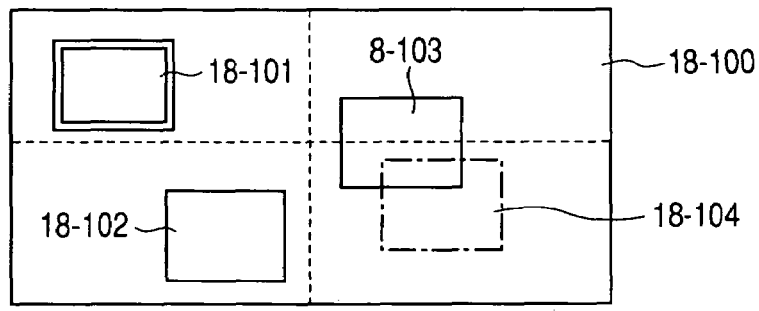
⇩ REQUESTING FIELD-OF-VIEW RANGE SETTING RIGHT
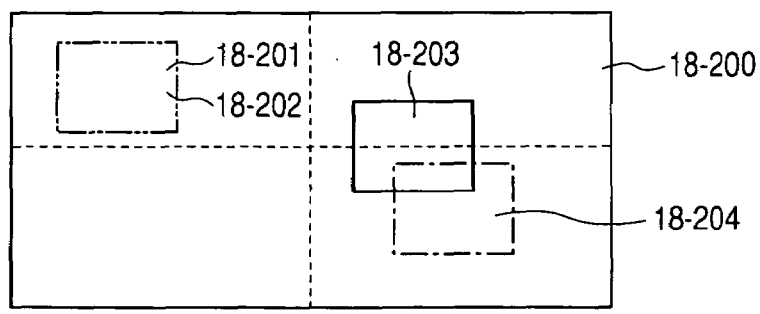

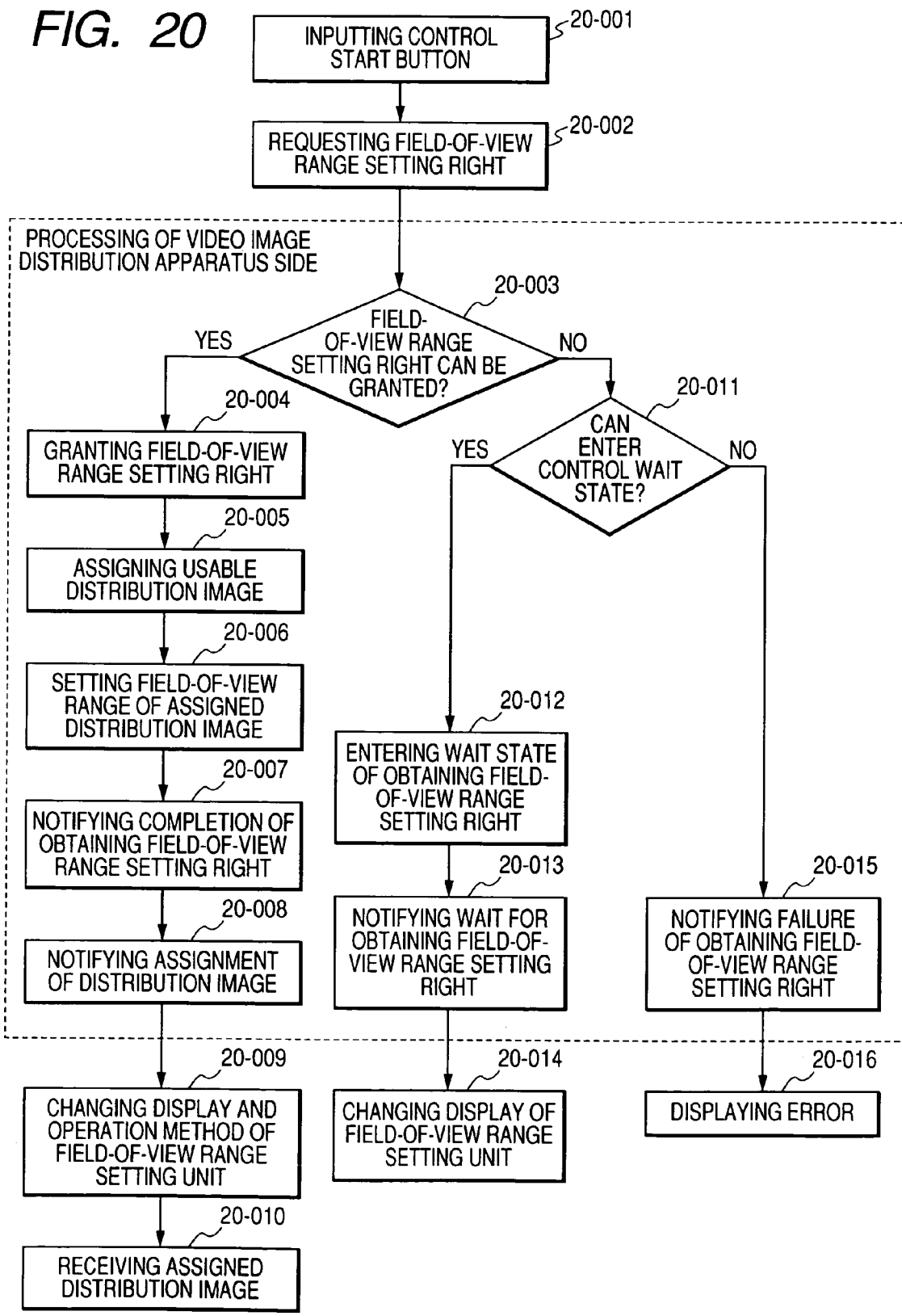

IMAGE DISTRIBUTION APPARATUS, IMAGE RECEIVING APPARATUS, MANAGEMENT METHOD FOR IMAGE DISTRIBUTION APPARATUS, AND SETTING METHOD FOR IMAGE RECEIVING APPARATUS

BACKGROUND OF THE INVENTION

1. Field of the Invention

The present invention relates to techniques of distributing a captured image from an image distribution apparatus to an image receiving apparatus.

2. Related Background Art

An image distribution system is known which outputs an image in a field-of-view range set by a user. An example of such a system is disclosed, for example, in Japanese Patent Application Laid-open No. H10-136347 (Patent Document 1). In this system, a client having a control right controls panning, tilting and zooming of a camera which mounts a zoom controllable optical system and a pan/tilt mechanism such as an electrically driven universal head. According to this control, the camera can capture and output an image in a designated field-of-view range.

Another example is a system including an image distribution apparatus capable of electronical operation of panning, tilting and zooming. For example, refer to Japanese Patent Application Laid-open No. H09-261522 (Patent Document 2). This image distribution apparatus cuts out an image in a field-of-view range designated by a client, from an image captured by using an optical system having a wide field-of-view. Cut-out images are output as an image stream (hereinafter called a distribution image) of consecutive still images or moving images. The optical system having a wide angle-of-view includes an omni directional mirror, a fisheye lens or a quasi wide angle lens having a plurality of lenses disposed adjacent to each other.

With the structure described in Patent Document 1, only one client having a control right can designate basically a field-of-view range at a time. The image distribution apparatus described in Patent Document 2 adopts the structure shown in FIG. 2 of Patent Document 2. Namely, if each of a plurality of distribution image generating units for executing an image cut-out process can generate a distribution image independently from other distribution image generating units, images having different angle-of-view ranges can be distributed to a plurality of clients.

There is no system which has the structure shown in FIG. 2 of Patent Document 2, can manage exclusive rights permitting to set a field-of-view range, as field-of-view range setting rights, and can allow only a client given the field-of-view range setting right to set a field-of-view range. If this system is realized, the field-of-view range setting right can be given at a time to n clients at the maximum.

A client not having the field-of-view range setting right can receive the same distribution image as that of a client having the field-of-view range setting right. However, with the structure described in Patent Document 1, only one distribution image is generated always so that it is impossible to select a field-of-view by selecting the distribution image. In contrast, with the structure described in Patent Document 2, the field-of-view can be selected by selectively receiving one of the n distribution images at the maximum. However, in order to realize the system described above, it is necessary to manage field-of-view range setting rights and clients in addition to a dedicated GUI. Using only the structures described in Patent Documents 1 and 2 is insufficient.

SUMMARY OF THE INVENTION

The present invention solves the above-described problems and aims to provide an image distribution apparatus, an image receiving apparatus, a management method for the image distribution method and a setting method for the image receiving apparatus, respectively easy to use, in an image distribution system capable of distributing images of different field-of-view ranges to a plurality of clients.

As one means for realizing this object, the present invention provides an image distribution apparatus comprising: a capture device for capturing an image; an image generation device for cutting out a portion of an image captured by the capture device; a setting right management device for managing a field-of-view range setting right which is a right of setting a field-of-view of an image to be distributed, and assigning an image receiving apparatus with the field-of-view range setting right; and a distribution image management device for receiving a field-of-view range setting request from the image receiving apparatus having the field-of-view range setting right and reflecting the field-of-view range setting request upon a cut-out position of an image given by the image generation device, and for receiving a field-of-view selection request from an image receiving apparatus not having the field-of-view range setting right and selecting an image to be distributed to the image receiving apparatus having the field-of-view range setting right as a distribution image to the image receiving apparatus not having the field-of-view range setting right.

Other features and advantages of the present invention will become apparent from the following description taken in conjunction with the accompanying drawings.

BRIEF DESCRIPTION OF THE DRAWINGS

The above-described object of the present invention will become apparent from the following detailed description when read in conjunction with the accompanying drawings.

FIG. 5 shows an example of a client state holding table in a client management unit.

FIG. 6 shows an example of a field-of-view range setting right management table in the client management unit.

FIG. 7 shows an example of a distribution image generation parameter holding table in a distribution image generation parameter management unit.

FIG. 17 shows another example of the field-of-view range setting right management table in the client management unit.

FIG. 18 is a diagram showing another specific change in GUI when the field-of-view range setting right is acquired in a panorama window.

FIG. 20 is a flow chart illustrating another field-of-view range setting right obtaining process by a client.

DETAILED DESCRIPTION OF THE PREFERRED EMBODIMENTS

Embodiments of the present invention will be described in detail with reference to the accompanying drawings.

First Embodiment

Figure 1:
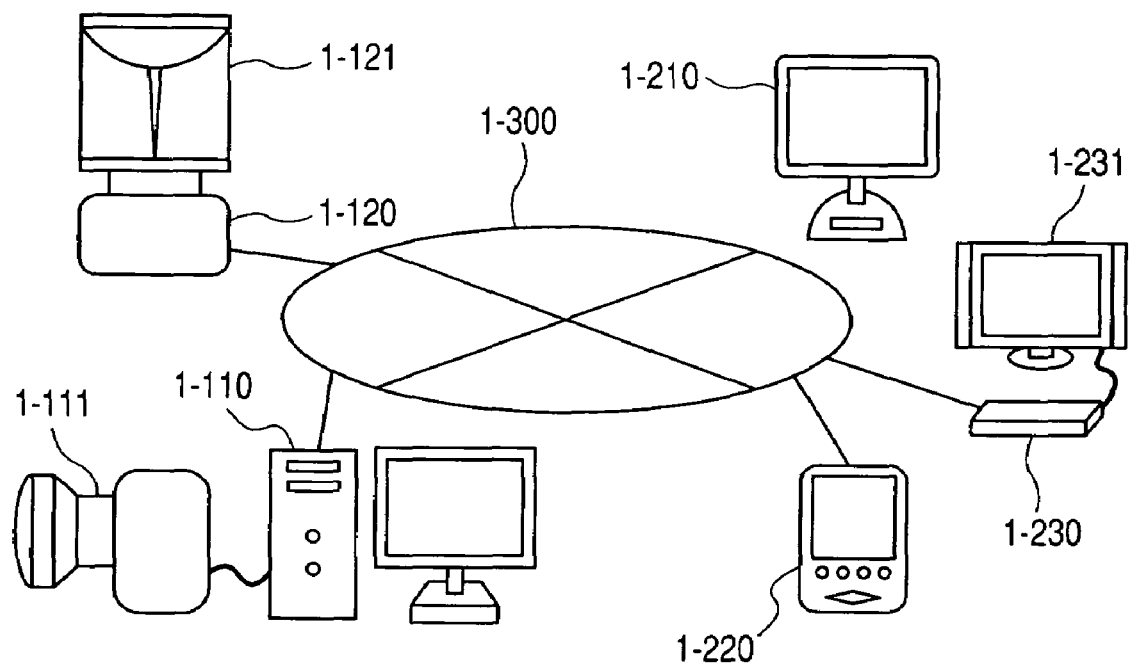
FIG. 1 is a block diagram showing an outline structure of an embodiment of the present invention.

FIG. 1 is a diagram showing an outline structure of an embodiment of the present invention. A network 1-300 may be the Internet, an intranet, telephone lines or a combination thereof. Image distribution apparatuses 1-110 and 1-120 and clients 1-210, 1-220 and 1-230 are connected to the network 1-300.

The image distribution apparatus 1-110 has a camera separated from the main body, and the image distribution apparatus 1-120 has a camera integral with the main body. Such image distribution apparatuses 1-110 and 1-120 are of the type made of dedicated hardware or the type made of a personal computer (PC) and software. An optical system of the camera may be a wide angle lens without distortion as well as an optical system with distortion such as an fisheye lens 1-111 and an omni directional mirror 1-121. It is also possible to dispose a plurality of lenses adjacent to each other and synthesize images captured by the lenses to form a wide angle image.

The client 1-120 is constituted of a PC and software, and the client 1-220 is constituted of a PDA, a portable phone and software. The client 1-230 is constituted of dedicated hardware and a display device 1-231.

Figure 2:
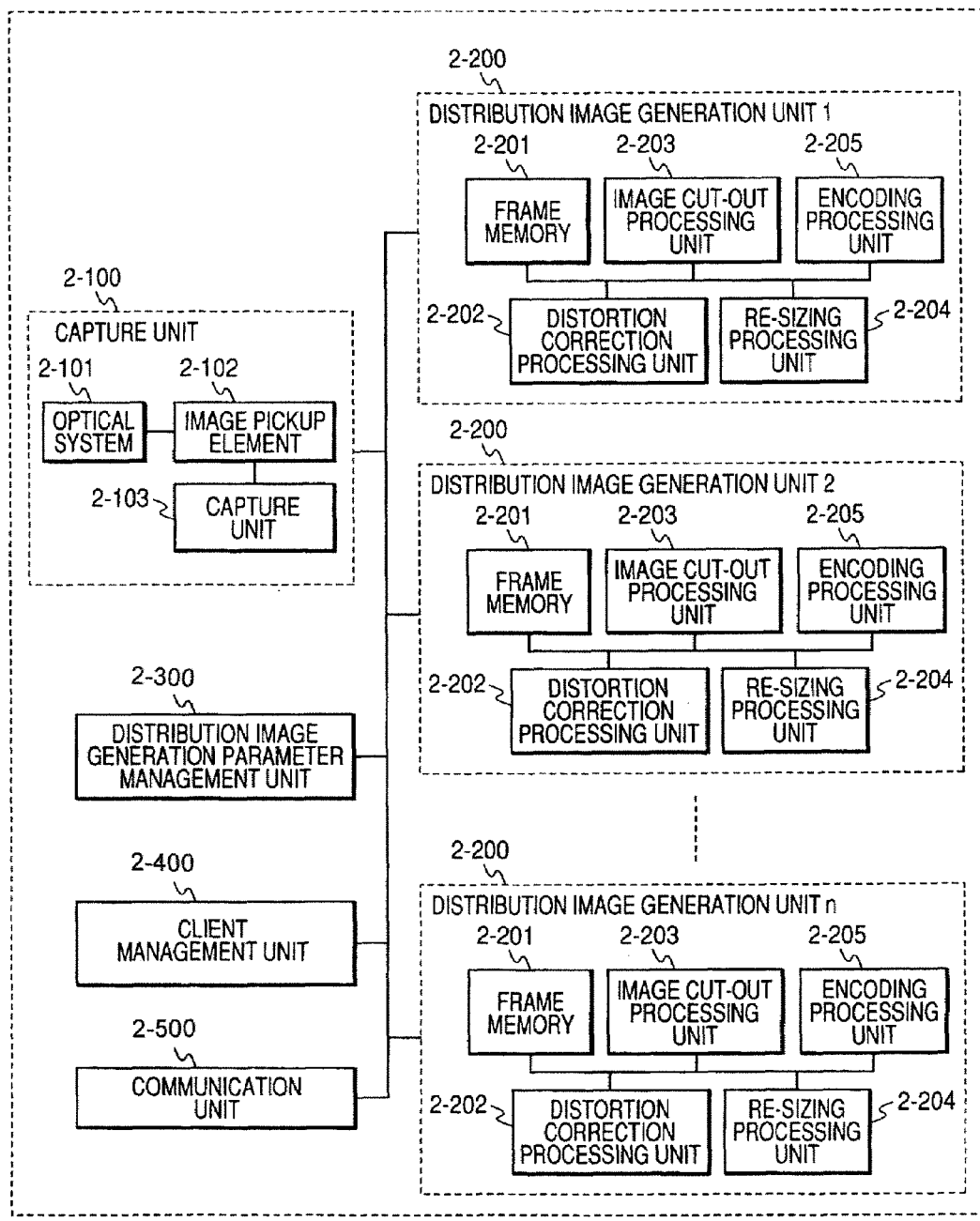
FIG. 2 is a block diagram showing an outline structure of an image distribution apparatus.

FIG. 2 is a block diagram showing the outline structure of an image distribution apparatus using an optical system with distortion. The image distribution apparatus shown in FIG. 2 includes a camera unit 2-100 and n distribution image generation units 2-200. The image distribution apparatus includes also a distribution image generation parameter management unit 2-300 for managing generation parameters which determine a distribution image generation method for the distribution image generation unit 2-200. The image distribution apparatus includes also a client management unit 2-400 for managing the status of each connected client and a field-of-view range setting right, and a communication unit 2-500 for transmitting/receiving data to/from a client via the network.

The camera unit 2-100 has an optical system 2-101, an image pickup unit 2-102 and a capture unit 2-103.

Each distribution image generation unit 2-200 includes a frame memory 2-101 for temporarily storing image data under processing, and a distortion correction processing unit 2-202 for correcting distortion in accordance with distortion characteristics of the optical system with large distortion when it is used. The distribution image generation unit includes also an image cut-out processing unit 2-203 for cutting out a part of an image, a re-sizing processing unit 2-204 for changing an image size by a re-sizing process or a re-sampling process, and an encoding processing unit 2-205 for encoding an image.

In the example of the structure shown in FIG. 2, it is assumed that the distribution image generation unit 2-200 is in one-to-one correspondence with a distribution image. In order to generate n distribution images, n distribution image generation units 2-200 are disposed. If one distribution image generation unit can generate a plurality of distribution images at a time, a part or all of distribution image generation units 2-200 may be integrated. Each image processing unit constituting the distribution image generation unit 2-200 may be made of a customized chip or made of a combination of a CPU or a DSP and software. Each image processing unit is not necessarily required to be provided independently for the image processing contents. If an optical system without distortion is used, the distortion correction processing unit 2-202 is not necessary. If zoom control and changing a size of a distribution image are not necessary, the re-sizing processing unit 2-204 is not necessary.

Figure 3:
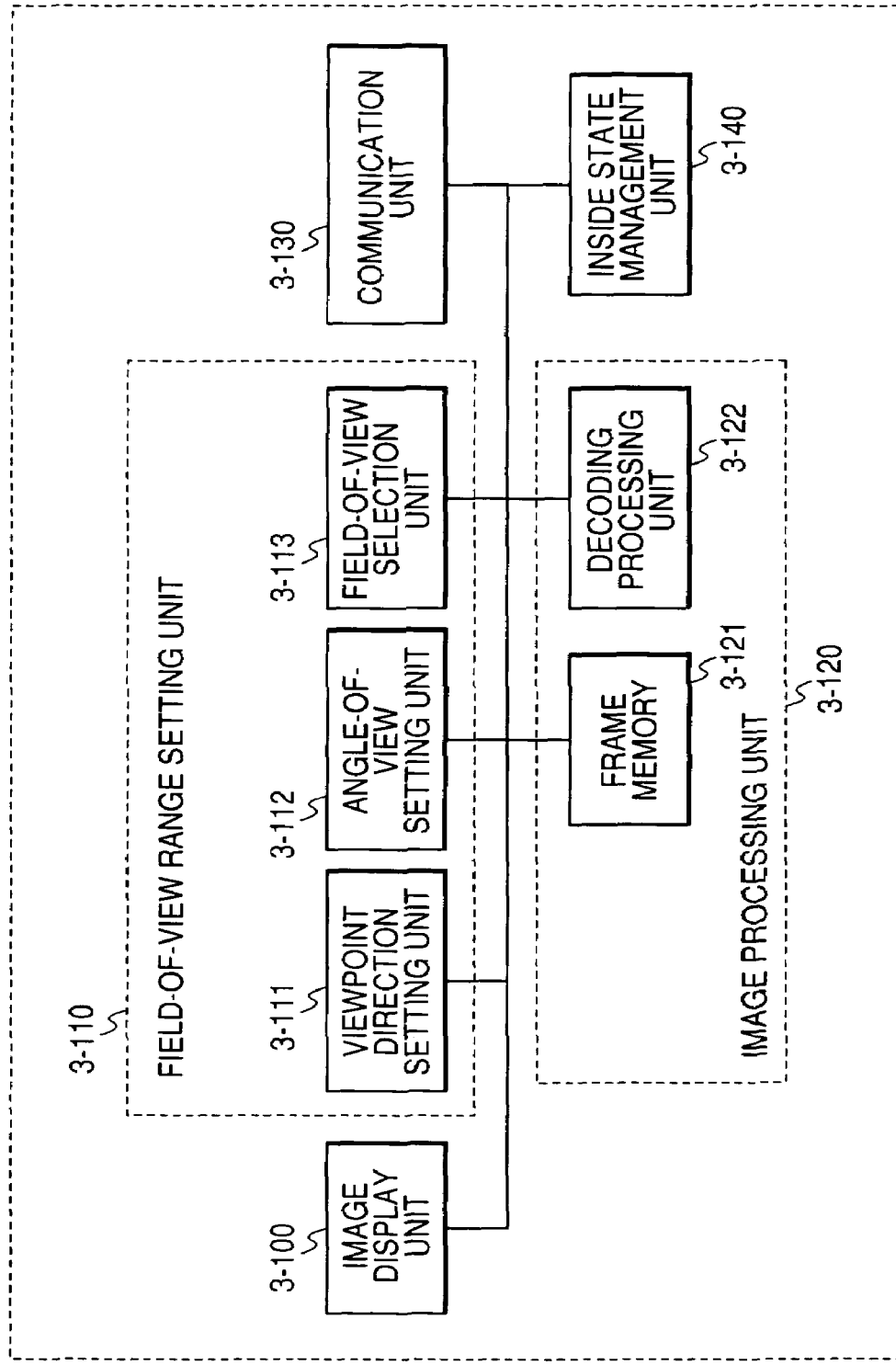
FIG. 3 is a block diagram showing an outline structure of a client.

FIG. 3 is a block diagram showing the outline structure of a client. A client of the embodiment includes an image display unit 3-100 for displaying an output image, a field-of-view range setting unit 3-110, an image processing unit 3-120 and a communication processing unit 3-130 for transmitting/receiving data to/from an image distribution apparatus. The client includes also a client management unit 3-140 for managing the internal state of the client and controlling each component of the client.

The field-of-view range setting unit 3-110 is constituted of: a viewpoint direction setting unit 3-111 for receiving a viewpoint direction designated by a user and indicating a viewpoint direction set on the side of the image distribution apparatus; an angle-of-view setting unit 3-112 for receiving an angle-of-view designated by a user and indicating an angle-of-view set on the side of the image distribution apparatus; and a field-of-view selection unit 3-113 for selecting a field-of-view by selecting a distribution image. The viewpoint direction setting unit 3-111, angle-of-view setting unit 3-112 and field-of-view selection unit 3-113 are not necessarily required to be independent but a part or all of them may be integrated.

The image processing unit 3-120 is constituted of a decoding processing unit 3-122 for decoding image data received from the image distribution apparatus and a frame memory 3-121 for temporarily storing image data under processing.

Figure 4:
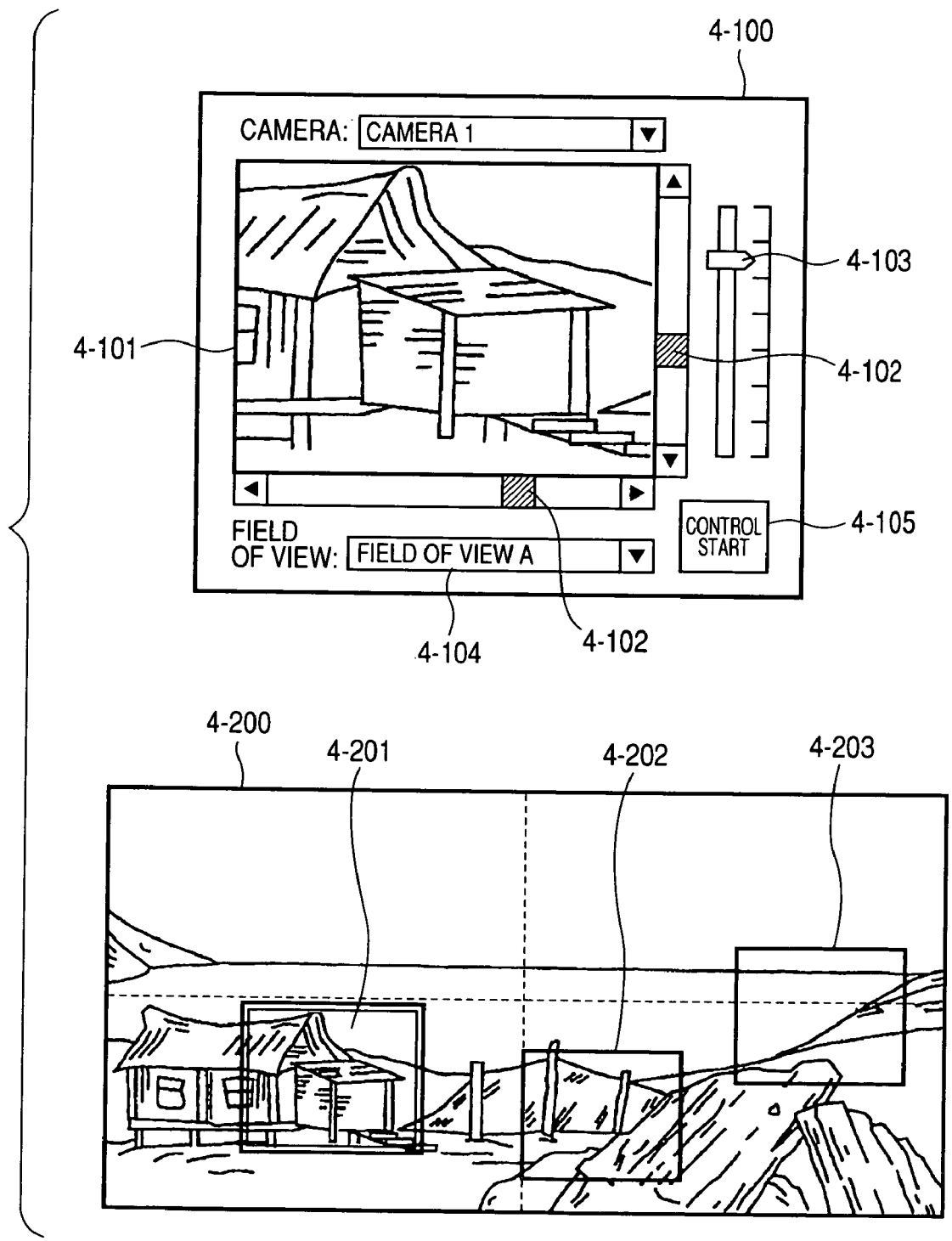
FIG. 4 is a diagram showing GUI of a client.

FIG. 4 shows an example of GUI of a client. A main window 4-100 displays an image label 4-101 corresponding to the image display unit 3-100 and a slide bar 4-102 corresponding to the viewpoint direction setting unit 3-111. The main window displays also a slide bar 4-103 corresponding to the angle-of-view setting unit 3-112, a list box 4-104 corresponding to the field-of-view selection unit 3-113 and a button 4-105 for starting obtaining a field-of-view range setting right. With these components, a user can enter basic operations. A panorama window 4-200 has field-of-view frames 4-201, 4-202 and 4-203 representative of a field-of-view range of each distribution image. By clicking and dragging the field-of-view frame, the field-of-view can be selected and a field-of-view range can be set.

FIG. 5 shows an example of a client state holding table in the client management unit 2-400. A client number is a number assigned to each connected client to identify the client. In the example shown in FIG. 5, the client management unit gives a serial number in the order of connection. A control level represents an acquisition priority order of the field-ofview range setting right of each client. In the example shown in FIG. 5, the priority order becomes high as the value of the control level becomes large. Even if a client having a smaller control level value has the field-of-view range setting right, a client having a larger control level value can request the field-of-view range setting right from the client having the smaller control level value.

A field-of-view number is a number for identifying a distribution image. In the example shown in FIG. 5, four distribution images (1) to (4) are generated. The distribution image (1) is distributed to clients having the client numbers 2, 7 and 8, the distribution image (2) is distributed to clients having the client numbers 1 and 3, the distribution image (3) is distributed to clients having the client numbers 4 and 6, and the distribution image (4) is distributed to a client having the client number 5. When a client selects a distribution image, the field-of-view number assigned to the client is replaced with the field-of-view number of the selected distribution image.

FIG. 6 shows an example of a field-of-view range setting right management table in the client management unit 2-400.

A control state indicates an acquisition state of the field-of-view range setting right of each client and is represented by two states "on control" and "control wait state". The "on control" indicates the state that the client has the field-of-view range setting right and can set the field-of-view range of the distribution image, and the "control wait state" indicates the state that the client waits for that the field-of-view range setting right possessed by another client is released. If a client requests the field-of-view range setting right in the state that another client having the same control level has the field-of-view range setting right, then the "control wait state" enters and the client can acquire the field-of-view range setting right when the other client loses the field-of-view range setting right.

In this embodiment, the field-of-view range setting rights are managed by a queue provided independently for each distribution image. Only one client at the top of each queue is "on control". When a client selects a distribution image and requests the field-of-view range setting right, the client enters the queue of the selected distribution image. If there is no client in the queue, the client enters the top of the queue and can acquire the field-of-view range setting right. If there is another client having the same control level in the queue, the client enters the last of the queue. If a client at the position different from the top disconnects or cancels a request for the field-of-view range setting right, this client at the intermediate position is removed from the queue so that the order of the subsequent clients is advanced. In the state that there are clients in the queue of a distribution image, if a client having a higher control level requests the field-of-view range setting right of the same distribution image, all the other clients are removed from the queue. The client having the higher control level enters the top of the queue and acquires the field-of-view range setting right.

In the example shown in FIG. 6, the distribution image (1) is controlled by the client 2, the distribution image (2) is controlled by the client 1, the distribution image (3) is controlled by the client 6, and the distribution image (4) is controlled by the client 5. The clients 8 and 7 are in the "control wait state" for the distribution image (1), and the client 4 is in the "control wait state" for the distribution image (3). When the client 2 is disconnected, the client 8 enters the top of the queue of the distribution image (1) and acquires the field-of-view range setting right, and the client 7 enters the second of the queue. If a client having the control level of 2 or larger requests the field-of-view range setting right of the distribution image (1), the clients 2, 8 and 7 are removed from the queue, and the client having the control level of 2 or larger enters the top of the queue and acquires the field-of-view range setting right. Since the client 5 has the control level of 2, the client having the control level of 1 cannot enter the queue of the distribution image (4) and cannot enter the "control wait state" even if it requests the field-of-view range setting right of the distribution image (4).

FIG. 7 shows an example of a distribution image generation parameter holding table in the distribution image generation parameter management unit 2-300.

The distribution image generation parameter holding table holds parameters for determining the field-of-view range of each distribution image. In the example shown in FIG. 7, parameters include "pan" indicating an angle in a height direction of a viewpoint direction, "tilt" indicating an angle in a width direction of a field-of-view direction, and "zoom" indicating an angle-of-view. In accordance with these parameters, an image cut-out portion of a captured image can be determined. These parameters change in response to a field-of-view range setting request from each client having the field-of-view range setting right of each distribution image.

Figure 8:
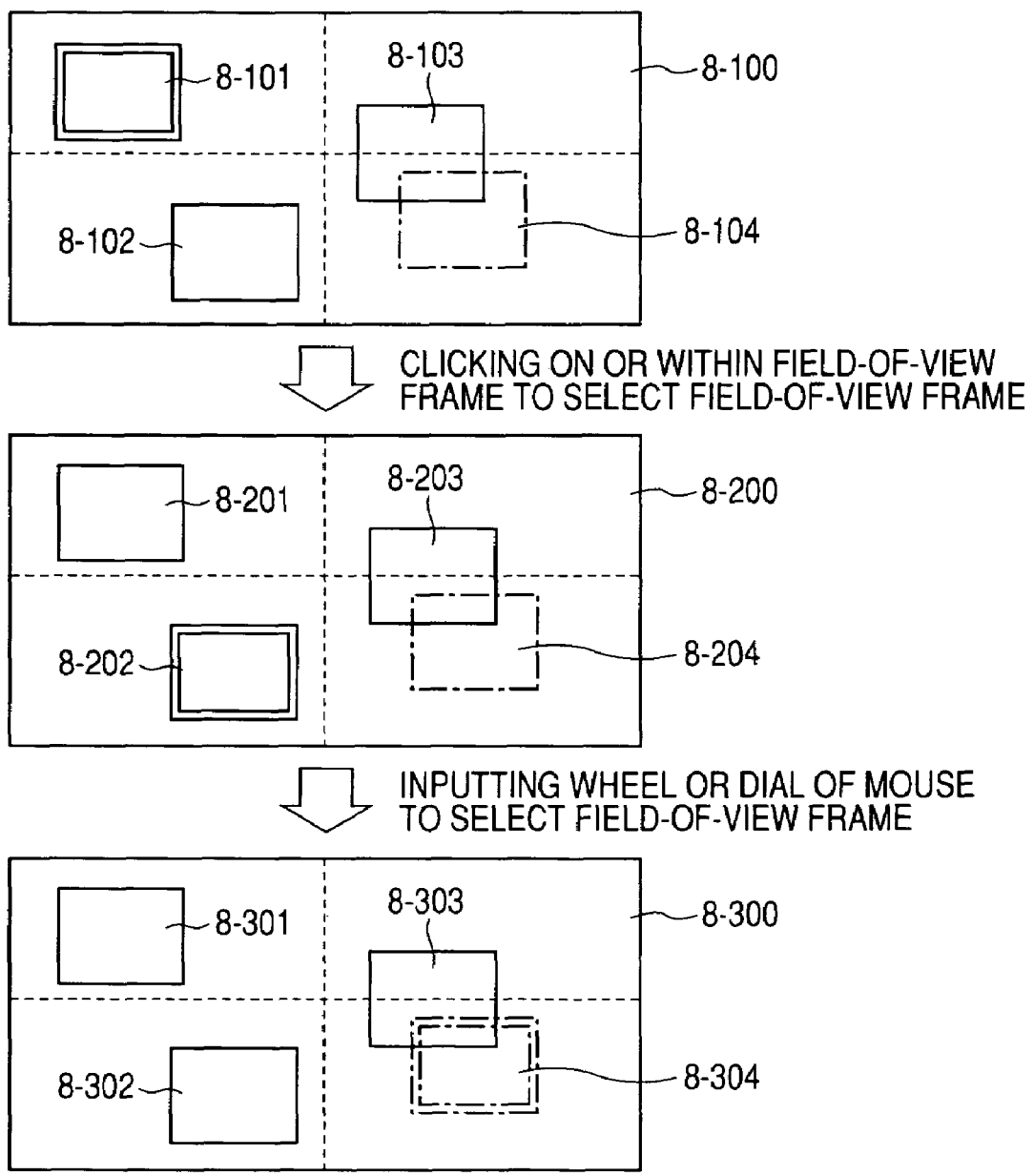
FIG. 8 is a diagram showing a specific change in GUI when a field-of-view is selected in a panorama window.

FIG. 8 shows an example of a specific change in GUI when a field-of-view is selected in the panorama window 4-200.

In the example shown in FIG. 8, the image distribution apparatus generates four distribution images. Four field-of-view frames 8-101, 8-102, 8-103 and 8-104 representative of the field-of-view range of each distribution image are displayed in a panorama window 8-100. The field-of-view frame 8-101 is displayed by using a different line of the frame in order to indicate that at present, this client does not have a field-of-view range setting right and receives a distribution image corresponding to the field-of-view frame 8-101 so that the field-of-view frame 8-101 is being selected. In this state, as the inner area or line of the field-of-view frame 8-102 is clicked, the distribution image corresponding to the field-of-view frame 8-102 is selected so that the field-of-view frames 8-101 and 8-102 are changed to field-of-view frames 8-201 and 8-202 and a selection request for the field-of-view frame is transmitted to the image distribution apparatus. The field-of-view frame can be selected by operating a wheel of a mouse or a cursor key. While the wheel of the mouse is operated in a panorama window 8-200 and circulated along each field-of-view frame, a field-of-view frame 8-304 is selected at which the wheel operation is stopped.

Figure 9:
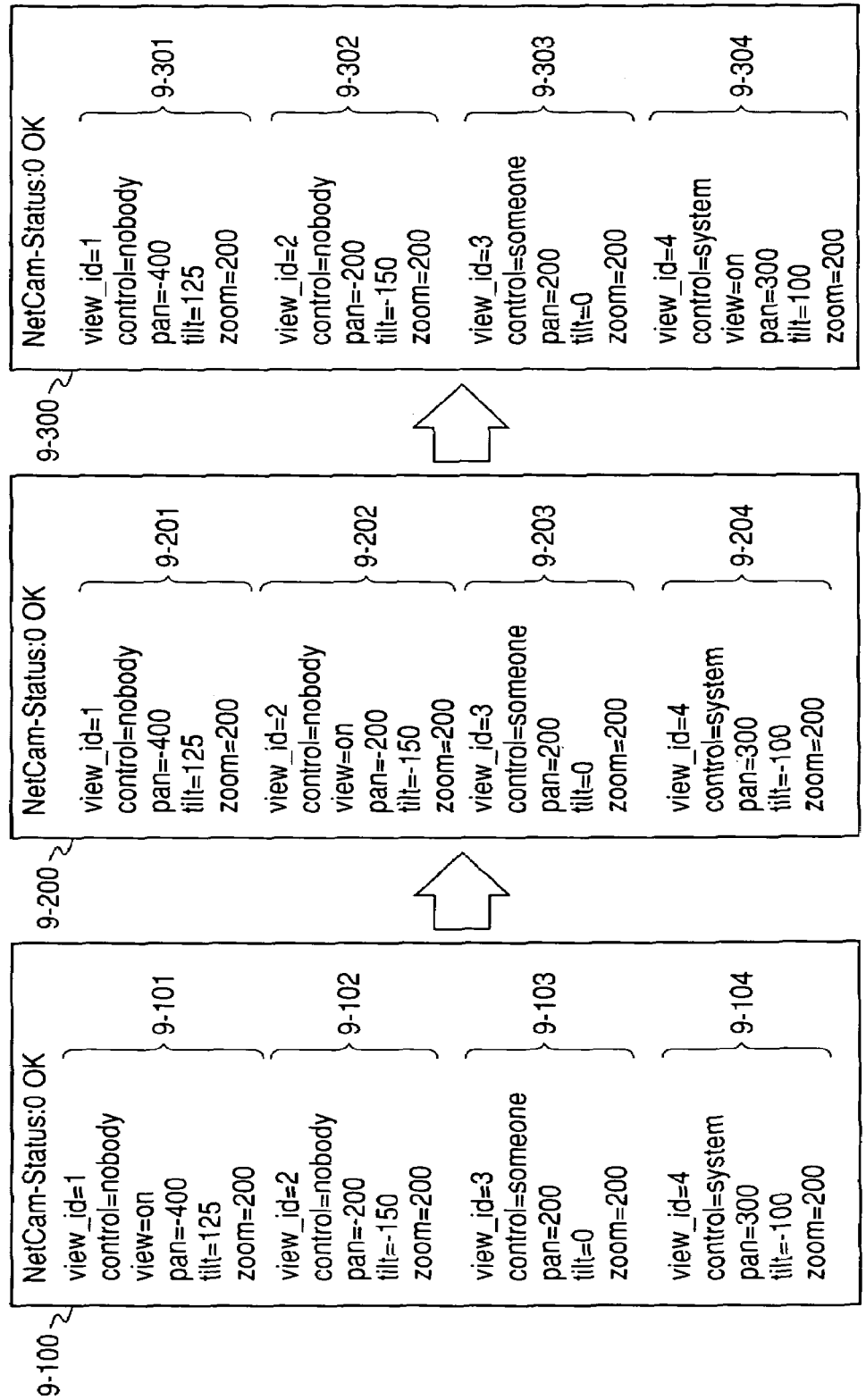
FIG. 9 shows an example of distribution image information in a field-of-view selection process.

FIG. 9 shows an example of distribution image information in the field-of-view selection process described with reference to FIG. 8. The image distribution apparatus of the embodiment transmits distribution image information to all connected clients to notify a state change in distribution images, when there occurs a change in a field-of-view range, a control state, an allocation state of each client or the like. The panorama window 8-100 is displayed basing upon distribution image information 9-100. The positions and sizes of the field-of-view frames 8-101, 8-102, 8-103 and 8-104 are decided by parameters 9-101, 9-102, 9-103 and 9-104. "view_id" indicates the field-of-view number. In this example, four distribution images 1 to 4 are generated.

"control" indicates the control state of each distribution image. A value "nobody" of "control" indicates that the distribution image is not controlled by any client. "someone" indicates that the distribution image is controlled by another client. "system" indicates that the image distribution apparatus itself is controlled by an automatic tracing function or the like. "view" indicates a distribution image assigned to own client, and in the case of the distribution image information 9-100, the distribution image having the field-of-view number of 1 is assigned. If "control=system", the control level is higher than that of "control=someone" and the field-of-view frame 8-104 is distinguishably displayed in a different color or line type. This indicates that a client having a low control level cannot acquire the field-of-view range setting right of the distribution image corresponding to the field-of-view frame 8-104.

As the field-of-view frame 8-102 is selected in the panorama window 8-100, distribution image information 9-200 is transmitted to notify assignment of the distribution image having the field-of-view number of 2. As the field-of-view frame 8-204 is selected in the panorama window 8-200, distribution image information 9-300 is transmitted to notify assignment of the distribution image having the field-of-view number of 4.

The distribution image information may be binary data instead of text data such as shown in FIG. 9, and may be included in a header field or the like of distribution image data. Instead of notifying information on all distribution images, when the state of a distribution image to be received by a transmission destination client changes, the information on only this distribution image may be transmitted. In this case, field-of-view ranges of other distribution images cannot be displayed as field-of-view frames.

Figure 10:
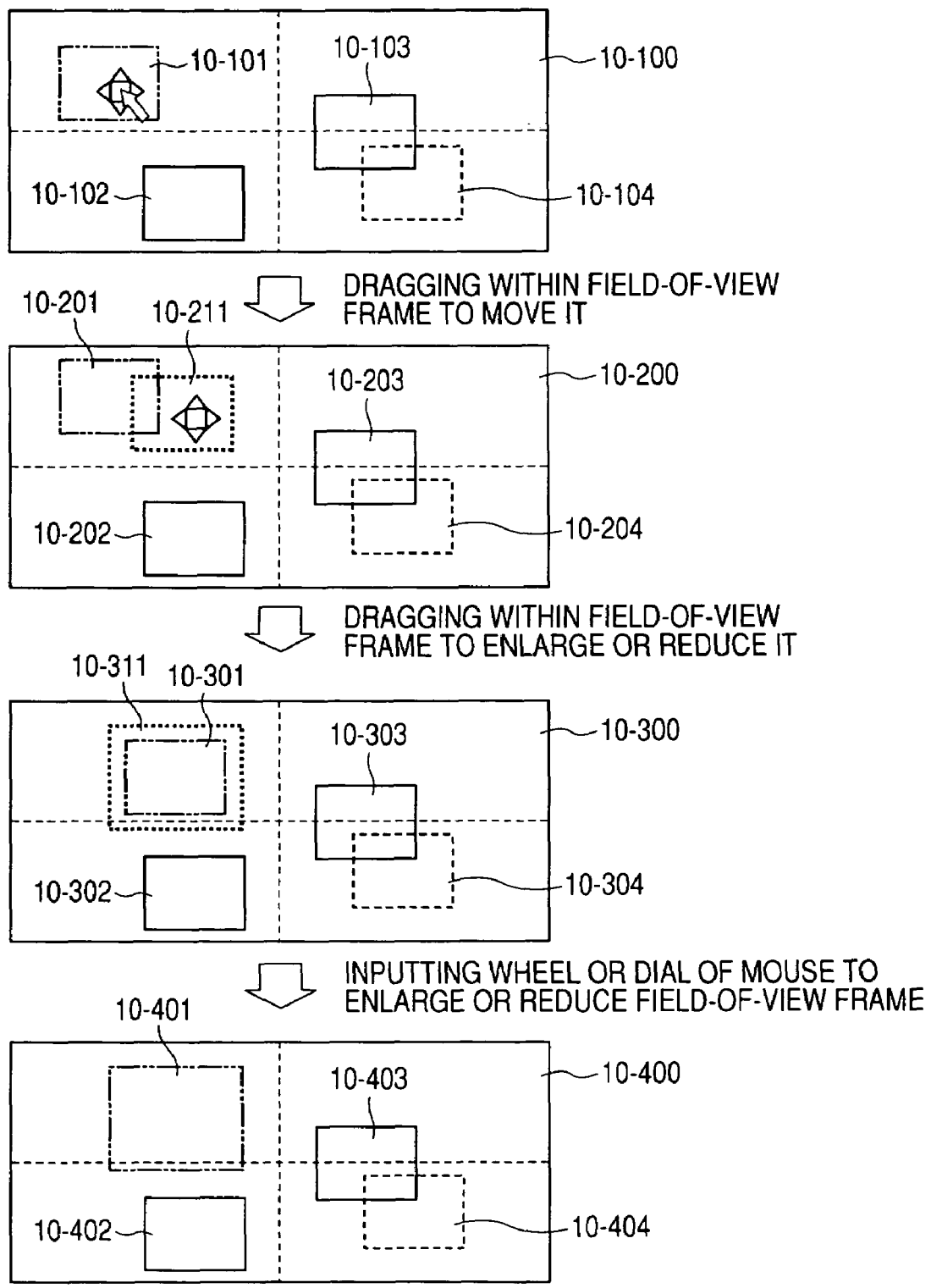
FIG. 10 is a diagram showing a specific change in GUI when a field-of-view range is set in a panorama window.

FIG. 10 shows a specific example of GUI when a field-of-view range is set in the panorama window 4-200. In the example shown in FIG. 10, the image distribution apparatus generates four distribution images, and four field-of-view frames 10-101, 10-102, 10-103 and 10-104 are displayed in a panorama window 10-100 to indicate the field-of-view of each distribution image. The field-of-view frame 10-101 is displayed by using a different line of the frame in order to indicate that at present, this client has a field-of-view range setting right of the distribution image corresponding to the field-of-view frame 10-101 so that the field-of-view frame 10-101 is controllable. In this state, as the inner area of the field-of-view frame 10-101 is clicked and dragged, the original position 10-201 moves to a position 10-211 after the drag. As the line of the field-of-view frame 10-211 is clicked and dragged, an original size 10-301 is changed to a size 10-311 after the drag. In either case, when the drag operation is completed, a field-of-view range setting request is transmitted to the image distribution apparatus.

Figure 11:
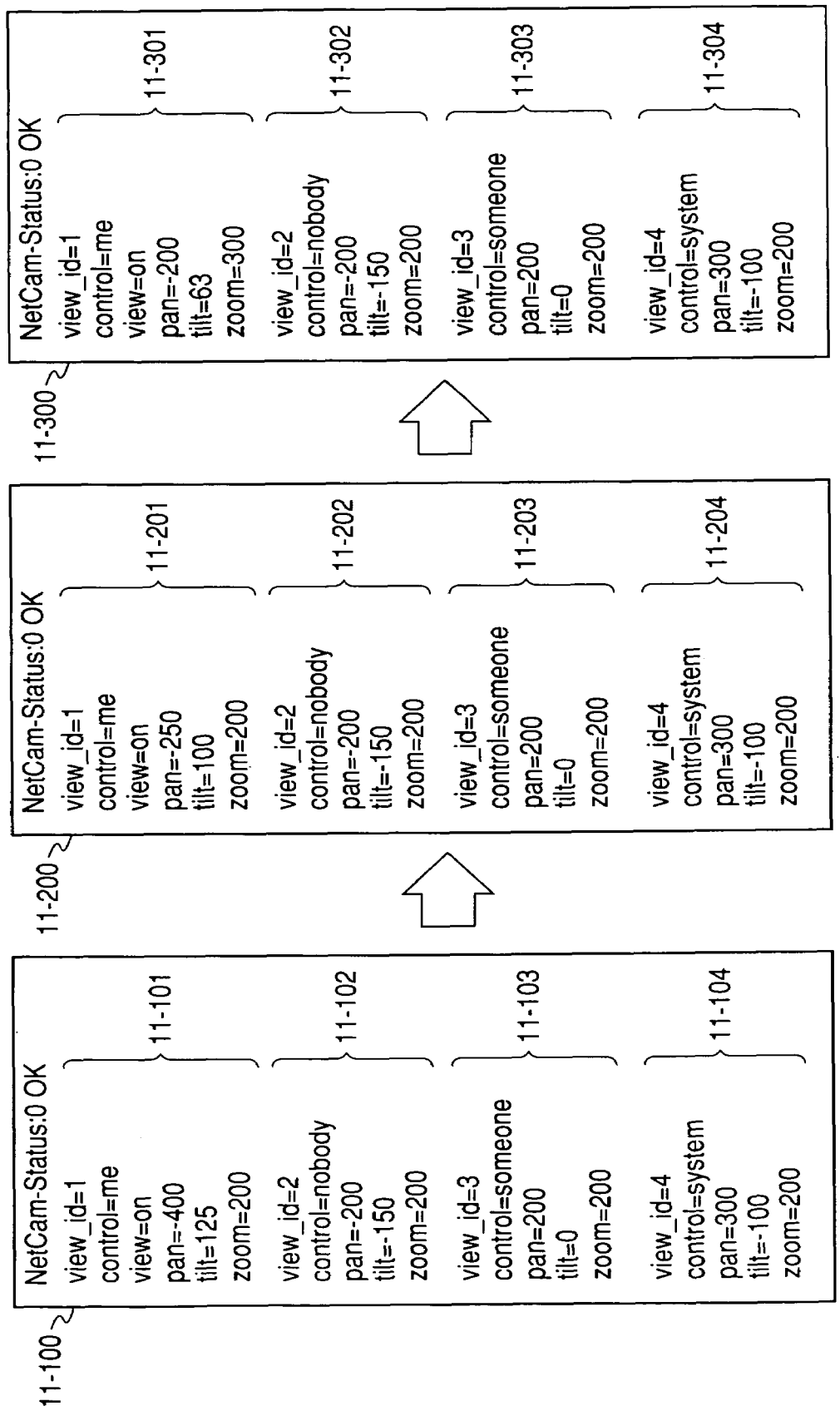
FIG. 11 shows an example of distribution image information in the field-of-view range setting process shown in FIG. 10.

FIG. 11 shows an example of distribution image information in the field-of-view selection process described with reference to FIG. 10. The panorama window 10-100 is displayed basing upon distribution image information 11-100. The positions and sizes of the field-of-view frames 10-101, 10-102, 10-103 and 10-104 are determined by parameters 11-101, 11-102, 11-103 and 11-104. A value "me" of "control" of the distribution image information indicates that own client has the field-of-view range setting right and that the field-of-view range of the distribution image having the field-of-view number of 1 can be set. "pan", "tilt" and "zoom" are generation parameters of each distribution image and indicate the position and size of the field-of-view range.

As the inner area of the field-of-view frame 10-201 in the panorama window 10-100 is clicked and dragged to the position of a field-of-view frame 10-211, distribution image information 11-200 is transmitted to notify the field-of-view range after control in which the values of "pan" and "tilt" are changed. As the line of a field-of-view frame 10-301 in a panorama window 10-200 is clicked and dragged to a size of a field-of-view frame 10-311, distribution image information 11-300 is transmitted to notify the field-of-view range after control in which the value of "zoom" is changed.

Figure 12:
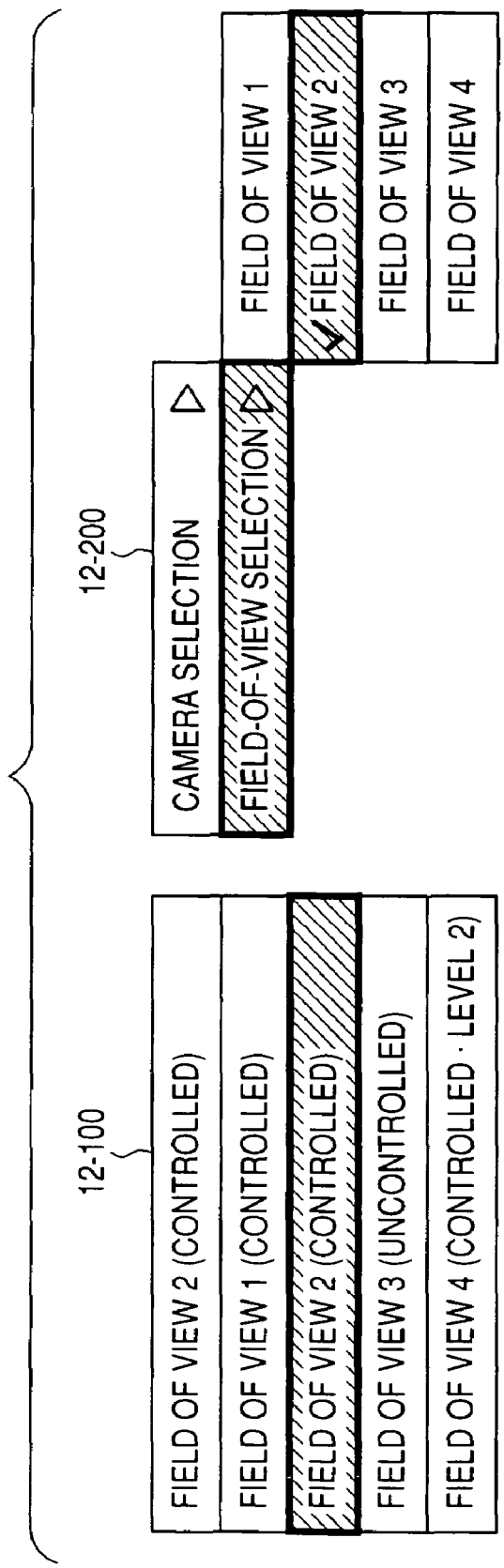
FIG. 12 shows a specific example of GUI of a field-of-view selection unit.

FIG. 12 shows a specific example of GUI in the field-of-view selection unit 3-113. In an example 12-100, the field-of-view selection unit is displayed as a drop-down list. A name set for each distribution image is displayed in each item, and information on each distribution image such as a control state and a control level is displayed in parentheses. In an example 12-200, the field-of-view selection unit is displayed as a menu. A name set for each distribution image is displayed in each item, and the name of a currently selected distribution image is affixed a check mark.

In this manner, GUI of the field-of-view selection unit displays information of each distribution image, such as a selection state, a control state and a control level, by using character strings and symbols so that a user can recognize each state easily. The information may be represented by colored characters, font types, underlines or the like in addition to character strings and symbols.

Figure 13:
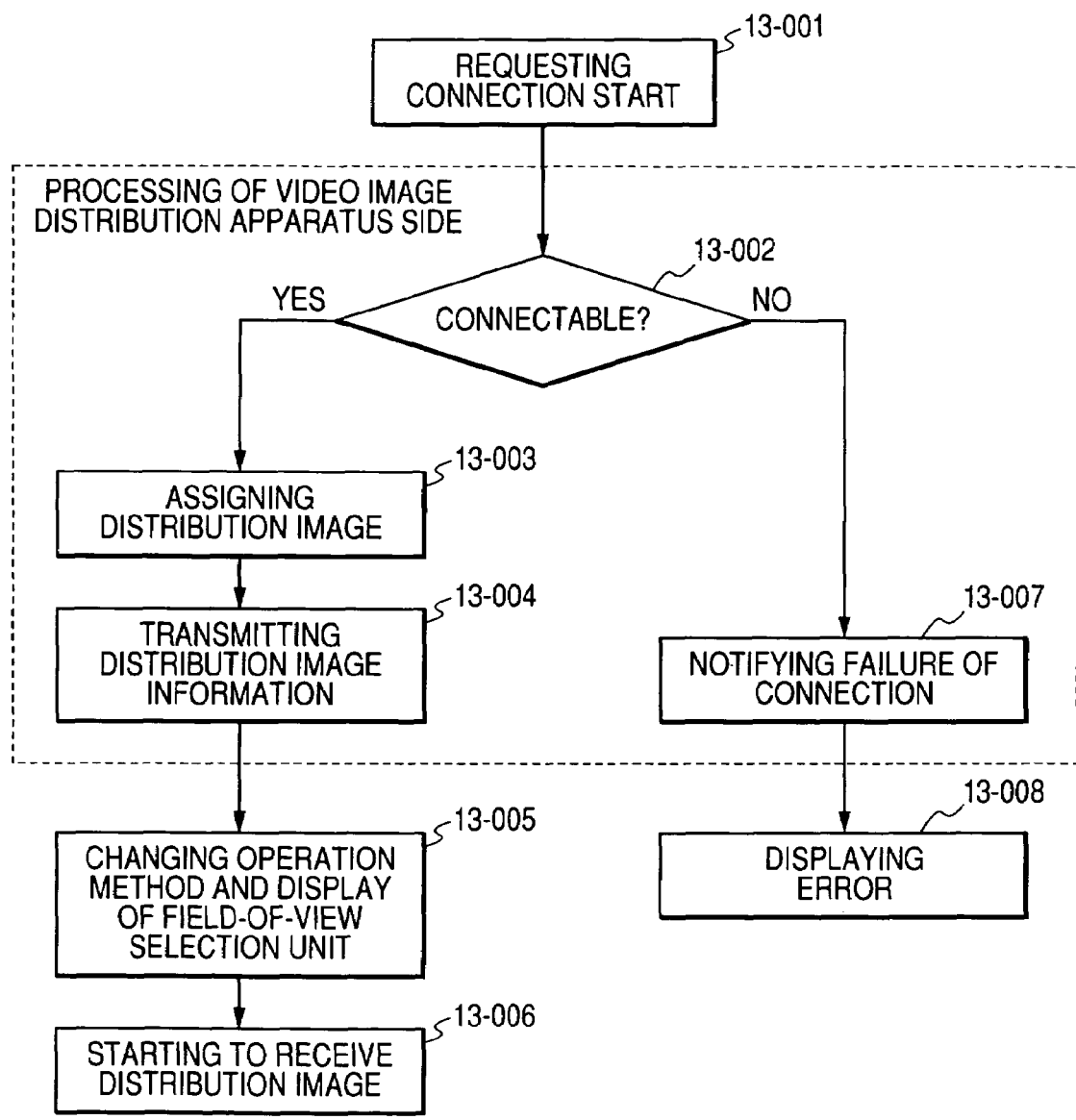
FIG. 13 is a flow chart illustrating a connection process by a client.

FIG. 13 is a flow chart illustrating a connection process of a client according to the embodiment.

As a client requests a connection start to the image distribution apparatus (13-001), the image distribution apparatus first judges whether connection is possible (13-002).

If it is judged that the connection is possible, the client management unit 2-400 of the image distribution apparatus assigns one distribution image (13-003), and the image distribution apparatus transmits distribution image information to notify the assigned distribution image (13-004). In accordance with the notified contents, the client which received the distribution image information changes a display of the field-of-view selection unit 3-113 to make it possible to receive a field-of-view select input by the user (13-005) and start receiving the assigned distribution image (13-006).

If it is judged that the connection is not possible (13-002), the image distribution apparatus notifies the client of a connection failure (13-007), and the client displays an error to notify the user of an error (13-008).

Figure 14:
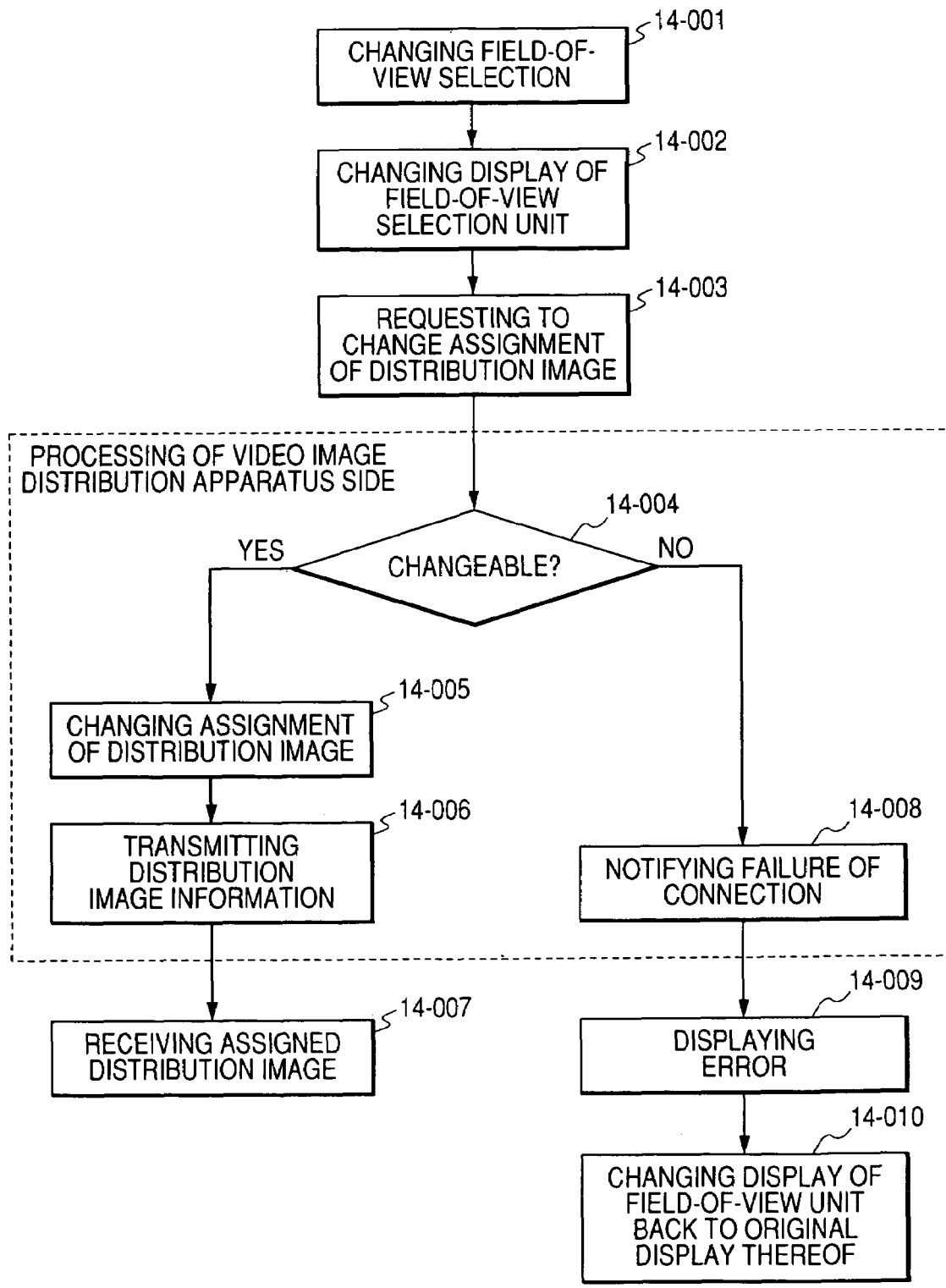
FIG. 14 is a flow chart illustrating a field-of-view selection process by a client.

FIG. 14 is a flow chart illustrating a field-of-view selection process to be executed by a client. As a user changes a field-of-view selection by selecting the field-of-view frame (14-001), the client first changes the display of the field-of-view selection unit 3-113, for example, by changing a selection item in the drop-down list for field-of-view selection. Next, the client requests the image distribution apparatus to change assignment of the distribution image (14-003). The image distribution apparatus requested a change in the assignment of the distribution image judges whether the assignment of the distribution image is possible (14-004).

If it is judged that the assignment of the distribution image is possible, the client management unit 2-400 changes the distribution image to the assignment selected distribution image (14-005). The distribution image information is transmitted to notify the assignment result of the distribution image (14-006). The client received the distribution image information starts receiving the newly assigned distribution image in accordance with the notified contents (14-007).

If it is judged that the assignment of the distribution image is not possible (14-004), the image distribution apparatus notifies the client of a failure of the assignment of the distribution image (14-008). The client notified of the failure of the assignment of the distribution image displays an error to notify it to the user (14-009). The display of the field-of-view selection unit changed at steps 14-001 and 14-002 is changed to the original display (14-010).

Figure 15:
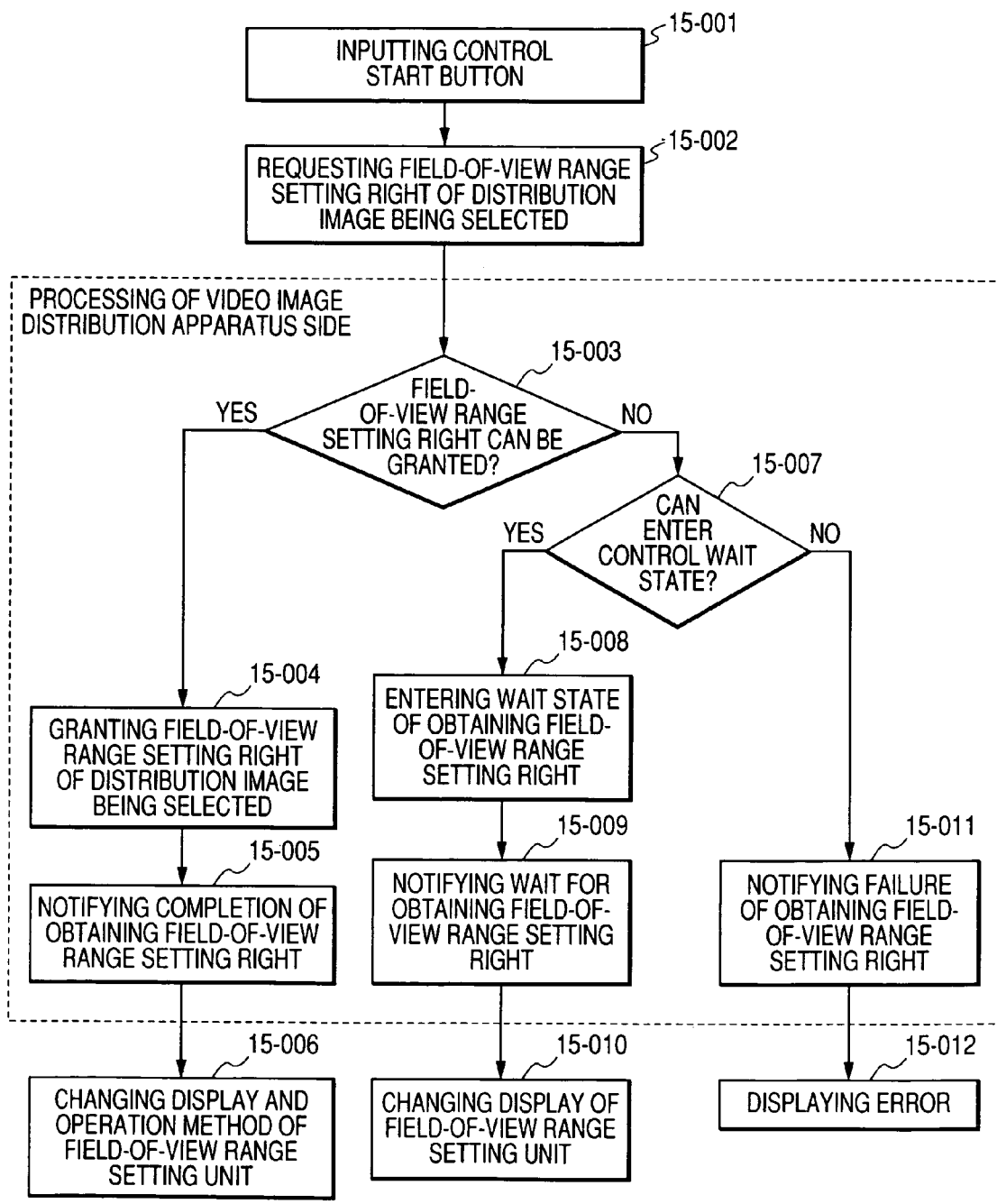
FIG. 15 is a flow chart illustrating a field-of-view range setting right obtaining process by a client.

FIG. 15 is a flow chart illustrating a field-of-view range setting right obtaining process by a client. As a user operates the control start button 4-105 in the state that a field-of-view is selected by the user (15-001), the client requests the fieldof-view range setting right of the selected distribution image (15-002). The image distribution apparatus requested the field-of-view range setting right judges whether the field-of-view range setting right can be given (15-003).

If it is judged that the field-of-view range setting right of the selected distribution image can be given (15-003), the image distribution apparatus gives the field-of-view range setting right of the selected distribution image (15-004) and notifies this effect to the client (15-005). The client notified of an acquisition completion of the field-of-view range setting right changes the display and operation method of the field-of-view range setting unit 3-110 to allow the position and size of the field-of-view range to be changed (15-006).

If it is judged that the field-of-view range setting right of the selected distribution image cannot be given (15-003), it is judged whether a control wait state can be entered (15-007). If it is judged that the control wait state can be entered (15-007), the image distribution apparatus makes the client enter the acquisition wait state of the field-of-view range setting right (15-008) and notifies the client of this effect (15-009). The client notified of entering the acquisition wait state of the field-of-view range setting right changes the display of the field-of-view range setting unit 3-110 to notify this effect to the user (15-010).

If it is judged that entering the control wait state is impossible (15-007), the image distribution apparatus notifies the client of a failure of obtaining the field-of-view range setting right (15-011). The client notified of the failure of obtaining the field-of-view range setting right displays an error to notify the user of this effect (15-012).

Figure 16:
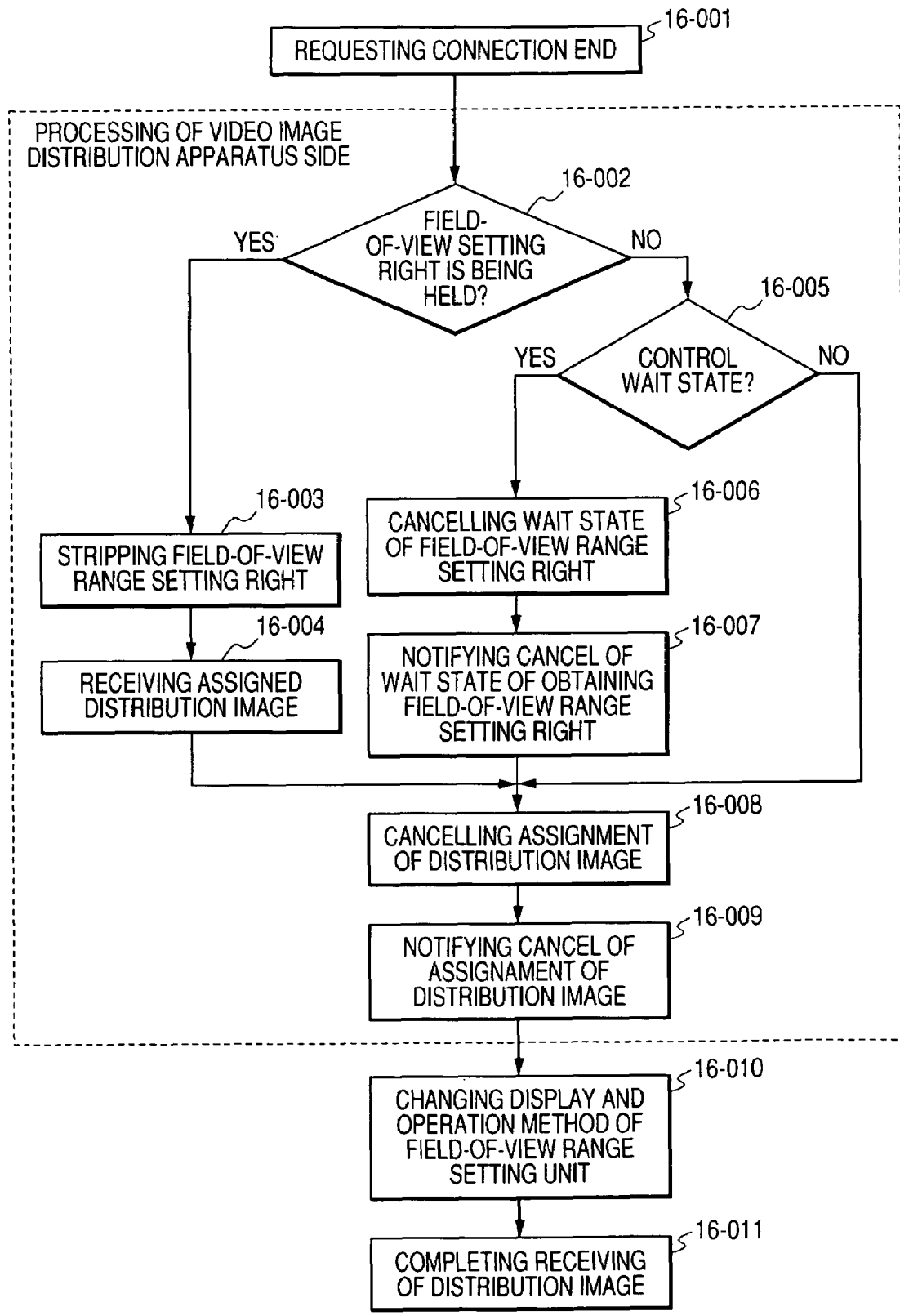
FIG. 16 is a flow chart illustrating a connection ending process by a client.

FIG. 16 is a flow chart illustrating a connection end process by a client. As a client requests a connection end from the image distribution apparatus (16-001), the image distribution apparatus first confirms whether the client has the field-of-view range setting right (16-002). The image distribution apparatus strips the field-of-view range setting right from the client (16-003) and notifies this effect to the client (16-004).

If it is confirmed that the client does not have the field-of-view range setting right (16-002), it is confirmed whether the client is in the control wait state (16-005). If it is confirmed that the client is in the control wait state (16-005), the image distribution apparatus cancels the wait state of the field-of-view range setting right of the client (16-006) and notifies the client of this effect (16-007).

If it is confirmed that the client is not in the control wait state (16-005), or step 16-004 or step 16-006 is completed, the image distribution apparatus cancels the assignment of the distribution image (16-008) and notifies the client of this effect (16-009). The client notified of a cancel of the assignment of the distribution image changes the display and operation method of the field-of-view range selection unit by stopping displaying the field-of-view frame or invalidating the field-of-view setting unit (16-010) to terminate the reception of the distribution image (16-011).

Second Embodiment

FIG. 17 shows an example of the field-of-view range setting right management table in the client management unit 2-400.

In the image distribution apparatus of this embodiment, a plurality of field-of-view range setting rights are collectively managed by one queue. If the number of distribution images generated at a time is n, clients from the top to n-th entries of the queue can obtain the field-of-view range setting right and clients after the n-th entry are in the acquisition wait state of the field-of-view range setting right. If a client having the control level of 1 requests the field-of-view range setting right, it enters the last of the queue. However, if a client having the control level of 2 or higher requests the field-of-view range setting right, it enters an entry preceding all other clients having a lower control level and is given the field-of-view range setting right with a priority over other clients. As a client at the position different from the top of the queue terminates a connection or cancels the request for the field-of-view range setting right this client is removed from the queue as an exception, and the order of subsequent clients is ascended.

In the example shown in FIG. 17, a distribution image (1) is controlled by a client 2, a distribution image (2) is controlled by a client 1, a distribution image (3) is controlled by a client 6, and a distribution image (4) is controlled by a client 5.

As the client 2 terminates the connection in this state, the order of subsequent clients is ascended and the client 4 obtains the field-of-view range setting right. The client 4 obtains the field-of-view range setting right of the distribution image (1) held by the client 2. If a client having the control level of 2 requests the field-of-view range setting right, this client enters the second entry after the client 5 having the control level of 2, and acquires the field-of-view range setting right of the distribution image (2) held by the client 1.

FIG. 18 is a diagram showing a specific change in GUI when the field-of-view range setting right is acquired in the panorama window 4-200.

In the example shown in FIG. 18, the image distribution apparatus generates four distribution images, and four field-of-view frames 18-101, 18-102, 18-103 and 18-104 are displayed in a panorama window 18-100 to indicate the field-of-view of each distribution image. At present, this client does not have a field-of-view range setting right and receives a distribution image corresponding to the field-of-view frame 18-101. The field-of-view frame 18-101 is displayed by using a different line of the frame in order to indicate that the field-of-view frame 18-101 is under selection. In this state, as the field-of-view range setting right is requested, the field-of-view range setting right of the distribution image among those images corresponding to the field-of-view frames 18-101, 18-102, 18-103 and 18-104 is given and the above-described distribution image is assigned as the distribution image of the client. As generation parameters of the assigned distribution image, the same generation parameters as those selected at the time when the field-of-view range setting right was requested are used.

Figure 19:
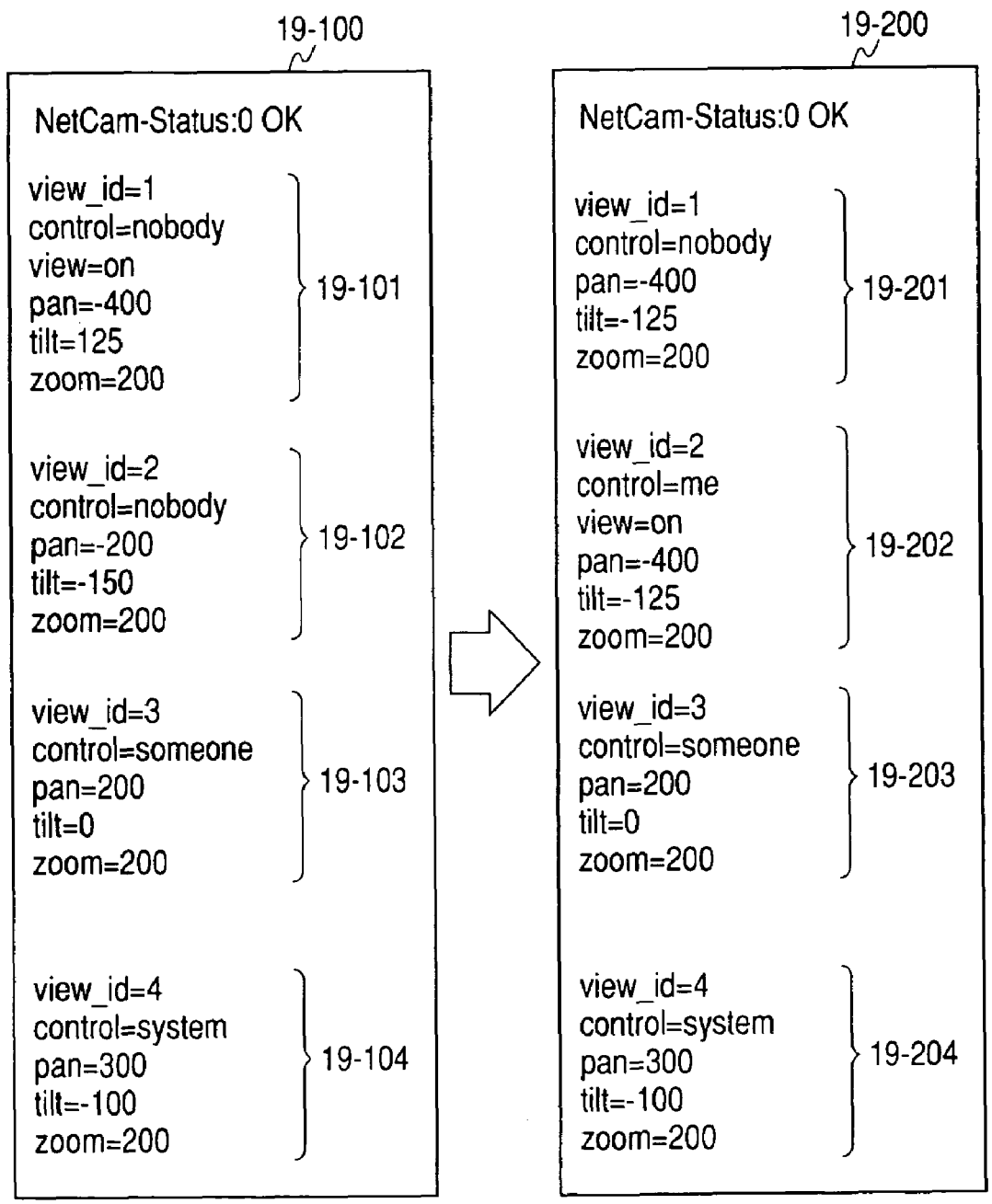
FIG. 19 shows another example of distribution image information in the field-of-view selection process.

FIG. 19 shows an example of distribution image information in the field-of-view selection process described with reference to FIG. 18. The panorama window 18-100 is displayed basing upon distribution image information 19-100. The positions and sizes of the field-of-view frames 18-101, 18-102, 18-103 and 18-104 are determined by parameters 19-101, 19-102, 19-103 and 19-104.

In the example shown in FIG. 18, at the time when the field-of-view range setting right is requested, the field-of-view frame 18-101 is selected. As the field-of-view range setting right of the distribution image corresponding to the field-of-view frame 18-102 is given, distribution image information corresponding to the field-of-view frame 18-102 changes from the parameters 19-102 to the parameters 19-202, with the value of "control" being changed from "nobody" to "me". As generation parameters of the distribution image corresponding to the field-of-view frame 18-102, the same generation parameters as those of the distribution image corresponding to the field-of-view frame 18-101 are set. Therefore, the same values as those of the parameters 19-201 are set as the values of the generation parameters of "pan", "tilt" and "zoom" in the distribution image information 19-202. The field-of-view frames 18-101 and 18-102 change therefore to the field-of-view frames 18-201 and 18-202. In this manner, even if the field-of-view range setting right is given to the distribution image different from the selected distribution image, the distribution image received by the client does not change before and after the field-of-view range setting right is obtained. It is not necessary for the user to know that assignment of the distribution image has changed.

FIG. 20 is a flow chart illustrating a field-of-view range setting right obtaining process by a client. As a user operates the control start button 4-105 (20-001), the client requests the field-of-view range setting right (20-002) and the image distribution apparatus judges whether the field-of-view range setting right can be assigned (20-003).

The image distribution apparatus gives a field-of-view range setting right of a distribution image (20-004), by referring to the field-of-view range setting right management table shown in FIG. 17 and if the field-of-view range setting right can be given to the distribution image (20-003). The controllable distribution image is assigned as the distribution image to the client in the client state holding table shown in FIG. 5 (20-005). As the distribution image is assigned, the same generation parameters as those of the selected distribution image are set as the generation parameters of the distribution image assigned at step 20-005, among the generation parameters in the distribution image generation parameter holding table shown in FIG. 7. Next, the image distribution apparatus notifies the client of an acquisition completion of the field-of-view range setting right (20-007) and of the assignment of the distribution image (20-008).

Upon reception of the notices at steps 20-007 and 20-008, the client changes the display of the field-of-view range setting unit 3-110 in accordance with the contents of the notices. After this change, the operation method is changed to allow setting of the field-of-view range (20-009), and receiving of the assigned distribution image starts (20-010).

If it is judged that it is impossible to give the field-of-view range setting right (20-003), the image distribution apparatus judges whether the request source client can enter the control wait state (20-011). If it is judged that the client can enter the control wait state, the image distribution apparatus makes the client enter the acquisition wait state of the field-of-view range setting right of the distribution image under selection (20-012) and notifies this effect to the client (20-013). The client notified of entering the acquisition wait state of the field-of-view range setting right notifies this effect to the user by changing the display of the field-of-view range setting unit 3-110 (20-014).

If it is judged that it is impossible to enter the control wait state (20-011), the image distribution apparatus notifies the client of a failure of obtaining the field-of-view range setting right (20-015). The client notified of the failure of obtaining the field-of-view range setting right displays an error to notify the user of this effect (20-016).

As described above, according to the first and second embodiments, a user can effectively utilize the function essentially provided in the image distribution apparatus with easy to use operations. The configuration of the field-of-view range setting right can be realized by partially adding functions to GUI of a client connected to the image distribution apparatus capable of panning, tilting and zooming operations. Accordingly, it is possible to realize a client having compatibility to both an already existing image distribution apparatus and the image distribution apparatus of the embodiments, with integrated operations.

The object of the present invention can also be achieved by providing a storage medium storing program codes for performing the aforesaid processes to an image distribution apparatus or an image receiving apparatus, reading the program codes, by a CPU or MPU of the image distribution apparatus or the image receiving apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a CPU of the image distribution apparatus or the image receiving apparatus, the present invention includes a case where an OS (operating system) or the like working on the computer performs a part or entire processes in accordance with designations of the program codes and realizes the functions according to the above embodiments.

Furthermore, the present invention also includes a case where, after the program codes read from the storage medium are written in a function expansion card which is inserted into the image distribution apparatus or the image receiving apparatus or in a memory provided in a function expansion unit which is connected to the image distribution apparatus or the image receiving apparatus, CPU or the like contained in the function expansion card or unit performs a part or entire process in accordance with designations of the program codes and realizes functions of the above embodiments.

The present invention has been described above in connection with the preferred embodiments. The present invention is not limited only to the above-described embodiments, but various alterations are possible without departing from the scope described in claims.

This application claims priority from Japanese Patent Application No. 2004-298401 filed on Oct. 13, 2004, which is hereby incorporated by reference herein.

What is claimed is:

1. An image distribution apparatus for distributing a portion of the image captured by a capture device, comprising:
    a setting right management device configured to assign a field-of-view range setting right, which is a right of setting a position to cut out an image captured by the capture device, to an image receiving apparatus; and
    a distribution management device configured to manage plural field-of-view range setting rights and distribute plural portions of the image each of which is cut out in accordance with a request to set a position to cut out the image from the image receiving apparatus having one of the field-of-view range setting rights,
    wherein the distribution management device selects one of the plural portions of the image in response to a field-of-view selection request from an image receiving apparatus not having the field-of-view range setting right and distributes the selected one of the plural portions of the image to the image receiving apparatus not having the field-of-view range setting right.

2. An image distribution apparatus according to claim 1, wherein said setting right management device manages the field-of-view range setting right by a queue independently provided for each field-of-view, and when the image receiving apparatus requests for the field-of-view range setting right by selecting a field-of-view of an image to be received, assigns the field-of-view range setting right for the selected field-of-view.

3. An image distribution apparatus according to claim 1, wherein said setting right management device collectively manages the field-of-view range setting right by a single queue provided for all fields-of-view, and when the image receiving apparatus requests for the field-of-view range setting right, automatically allocates a field-of-view for which the field-of-view range setting right is assigned.

4. An image distribution apparatus according to claim 3, wherein when the image receiving apparatus requests for the field-of-view range setting right, selected is a field-of-view predicted to be controllable or a controllable field-of-view.

5. An image distribution apparatus according to claim 4, wherein when the image receiving apparatus requests for the field-of-view range setting right, same generation parameters as generation parameters of a field-of-view selected before the field-of-view range setting right is obtained are set to a field-of-view assigned with the field-of-view range setting right.

6. An image distribution apparatus according to claim 1, further comprising a notice device for notifying each connected image receiving apparatus of fields-of-view ranges of all images to be distributed.

7. An image receiving apparatus for receiving a portion of the image captured by a capture device, comprising:
   a processing device configured to process a display of a window for setting a position and a size of a field of view of the image in a case of having a field-of-view range setting right which is a right of setting a position to cut out an image captured by the capture device, and configured to process a display of a list of field of views of the image for selecting one of the field of views to be received in a case of not having the field-of-view range setting right; and
   a receiving device configured to receive a portion of the image corresponding to the position and the size of the field of view of the image or a selected field of view from the list.

8. An image receiving apparatus according to claim 7, wherein either a line type or a line color of a frame of the field-of-view changes in accordance with an acquisition state of the field-of-view range setting right.

9. An image receiving apparatus according to claim 8, wherein either the line type or the line color of a frame of the field-of-view changes in accordance with whether a field-of-view is in the field-of-view range of an image received by own image receiving apparatus or by another image receiving apparatus.

10. An image receiving apparatus according to claim 8, wherein either the line type or the line color of a frame of the field-of-view changes in accordance with an acquisition state of the field-of-view range setting right of own image receiving apparatus or by another image receiving apparatus.

11. An image receiving apparatus according to claim 8, wherein the frame of the field-of-view is selected by clicking or tapping the frame of the field-of-view or an inner area of the frame of the field-of-view.

12. An image receiving apparatus according to claim 8, wherein the frame of the field-of-view is selected by rotating a wheel of a mouse or a dial, or activating a shuttle switch or a cursor key.

13. An image receiving apparatus according to claim 7, wherein as the field-of-view range setting right, a control level representative of an acquisition priority of the field-of-view range setting right can be set to each image receiving apparatus, and either a line type or a line color of a frame of the field-of-view changes in accordance with the control level.

14. An image receiving apparatus according to claim 7, wherein the field-of-view is selected by selecting an item of a GUI component such as a combo box or a list box.

15. An image receiving apparatus according to claim 14, wherein at least one of a character string, a color and a symbol of the GUI component changes in accordance with an acquisition state of the field-of-view range setting right.

16. An image receiving apparatus according to claim 14, wherein at least one of a character string, a color and a symbol of the GUI component changes in accordance with whether the field-of-view range is a field-of-view range of a received image by own image receiving apparatus or another image receiving apparatus.

17. An image receiving apparatus according to claim 14, wherein at least one of a character string, a color and a symbol of the GUI component changes in accordance with an acquisition state of the field-of-view range setting right by own image receiving apparatus or another image receiving apparatus.

18. An image receiving apparatus according to claim 14, wherein as the field-of-view range setting right, a control level representative of an acquisition priority of the field-of-view range setting right can be set to each image receiving apparatus, and at least one of a character string, a color and a symbol of the GUI component changes in accordance with the control level.

19. A management method for an image distribution apparatus for distributing a portion of the image captured by a capture device, comprising steps of:
   assigning a field-of-view range setting right, which is a right of setting a position to cut out an image captured by the capture device, to an image receiving apparatus;
   managing plural field-of-view range setting rights;
   distributing plural portions of the image each of which is cut out in accordance with a request to set a position to cut out the image from the image receiving apparatus having one of the field-of-view range setting rights; and
   selecting one of the plural portions of the image in response to a field-of-view selection request from an image receiving apparatus not having the field-of-view range setting right, and distributing the selected one of the plural portions of the image to the image receiving apparatus not having the field-of-view range setting right.

20. A setting method for an image receiving apparatus for receiving a portion of the image captured by a capture device, comprising steps of:
   processing a display of a window for setting a position and a size of a field of view of the image in a case of having a field-of-view range setting right which is a right of setting a position to cut out an image captured by the capture device;
   processing a display of a list of field of views of the image for selecting one of the field of views to be received in a case of not having the field-of-view range setting right; and
   receiving a portion of the image corresponding to the position and the size of the field of view of the image or a selected field of view from the list.

* * * * *